United States Patent
Dupuis et al.

(10) Patent No.: US 9,572,035 B2
(45) Date of Patent: *Feb. 14, 2017

(54) METHOD AND APPARATUS FOR UNLOCKING A MOBILE TELEPHONE TYPE WIRELESS COMMUNICATION TERMINAL

(71) Applicant: DRNC Holdings, Inc., Wilmington, DE (US)

(72) Inventors: Thierry Dupuis, Rueil (FR); Alain Guirauton, Argenteuil (FR)

(73) Assignee: DRNC Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/141,955

(22) Filed: Apr. 29, 2016

(65) Prior Publication Data

US 2016/0249219 A1    Aug. 25, 2016

Related U.S. Application Data

(63) Continuation of application No. 14/064,594, filed on Oct. 28, 2013, now Pat. No. 9,357,392, which is a
(Continued)

(30) Foreign Application Priority Data

Mar. 26, 2003  (FR) ...................... 03 03690

(51) Int. Cl.
*H04W 12/08* (2009.01)
*H04W 8/20* (2009.01)
*H04W 12/12* (2009.01)

(52) U.S. Cl.
CPC ............. *H04W 12/08* (2013.01); *H04W 8/205* (2013.01); *H04W 12/12* (2013.01)

(58) Field of Classification Search
CPC ........ H04W 12/06; H04W 12/08; H04W 8/18; H04W 8/183; H04W 8/245; H04W 8/265; H04W 88/02; H04M 1/673
See application file for complete search history.

(56) References Cited

U.S. PATENT DOCUMENTS

| | | | |
|---|---|---|---|
| 6,052,581 | A | 4/2000 | O'Connell et al. |
| 6,124,799 | A | 9/2000 | Parker |

(Continued)

FOREIGN PATENT DOCUMENTS

| | | |
|---|---|---|
| EP | 1061755 | 12/2000 |
| EP | 1263248 | 12/2002 |
| WO | WO-98/57511 | 12/1998 |

OTHER PUBLICATIONS

"European Search Report", EP Application No. 04290731.1-2412-, Jul. 16, 2004, 2 pages.
(Continued)

*Primary Examiner* — Nam Huynh
(74) *Attorney, Agent, or Firm* — Eric Berkowitz

(57) ABSTRACT

A method of unlocking a mobile terminal and a mobile terminal is disclosed. The mobile terminal is initially locked to the services of a mobile services provider. The mobile services provider transmits to a predefined telephone number associated with a service provider other than the mobile services provider, via the mobile services provider, a request for unlocking information. The request is transparent to the mobile services provider. If the request is approved, the mobile terminal receives the unlocking information. Using the received unlocking information, the mobile terminal unlocks itself so that it is no longer locked to the services of the mobile services provider. If the request is not approved, the mobile terminal receives and displays a message indicating that the request is not approved.

12 Claims, 1 Drawing Sheet

Related U.S. Application Data continuation of application No. 12/730,385, filed on Mar. 24, 2010, now Pat. No. 8,600,351, which is a continuation of application No. 10/808,465, filed on Mar. 25, 2004, now Pat. No. 7,689,204.

(56) References Cited

U.S. PATENT DOCUMENTS

| | | |
|---|---|---|
| 6,314,283 B1 | 11/2001 | Fielden |
| 6,550,010 B1 | 4/2003 | Link, II et al. |
| 6,577,857 B1 | 6/2003 | Rodriguez |
| 6,611,913 B1 | 8/2003 | Carroll et al. |
| 6,829,492 B2 | 12/2004 | Aerrabotu |
| 2004/0092248 A1 | 5/2004 | Kelkar et al. |

OTHER PUBLICATIONS

"United States Office Action", U.S. Appl. No. 14/064,594, Apr. 21, 2015, 11 pages.

"United States Office Action", U.S. Appl. No. 12/730,385, Jan. 17, 2013, 7 pages.

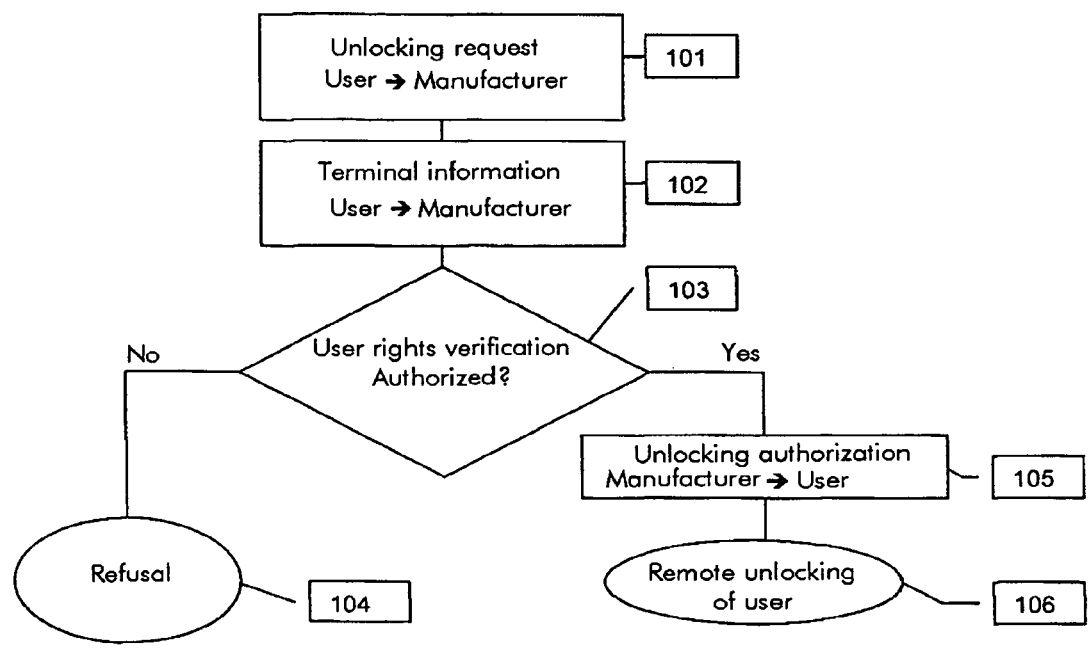

METHOD AND APPARATUS FOR UNLOCKING A MOBILE TELEPHONE TYPE WIRELESS COMMUNICATION TERMINAL

CROSS REFERENCE TO RELATED APPLICATIONS

This application is a continuation of U.S. patent application Ser. No. 14/064,594 filed Oct. 28, 2013, which is a continuation of U.S. patent application Ser. No. 12/730,385 filed Mar. 24, 2010, now U.S. Pat. No. 8,600,351, which is a continuation of U.S. patent application Ser. No. 10/808,465, filed Mar. 25, 2004, now U.S. Pat. No. 7,689,204, which claims priority from French Patent Application No. 03 03 690, filed Mar. 26, 2003, the contents of each being incorporated by reference as if fully set forth herein.

FIELD OF INVENTION

The embodiments of the present invention described herein relate to methods of unlocking mobile telephone type wireless communication terminals and, more particularly, to SIM-LOCK type systems.

BACKGROUND

A locking system provides the following actions: locking a mobile telephone to the services of a particular operator; locking a mobile telephone to particular services of a given operator; and locking a mobile telephone to a given SIM card microchip to prevent the use of the mobile telephone with a microchip card other than that with which the telephone was sold.

The locking system generally allows an operator to ensure that a customer who has purchased a telephone in the context of a promotion, whereby the telephone is sold at a very much reduced price on condition that the customer uses a particular subscription for a relatively long period, will comply with the terms of his agreement. This also solves other problems, for example the use of a stolen telephone with another microchip card.

It is nevertheless necessary to provide means for canceling such
locking, for example at the end of an agreement.

A specific piece of information referred to hereinafter as the locking key is introduced into the telephone by the manufacturer during its manufacture, and problems with unlocking relate essentially to relations between the user of the telephone and the telephone operator, the standard practice being for a manufacturer to communicate a list of keys to an operator. The latter then carries out the unlocking at the request of the user, after verifying the latter's rights.

Transferring unlocking keys necessitates secure communication between manufacturers and operators.

As there is generally no exclusive agreement between them, each manufacturer supplies all operators, and vice-versa. Communication is not secure.

Furthermore, the number of telephone designs increases daily. There are therefore serious communication problems that lead to serious malfunctions and a very large number of complaints from users.

SUMMARY

An embodiment of the present invention is directed to a method of unlocking a mobile terminal, which is initially locked to the services of a mobile services provider. The mobile services provider transmits to a predefined telephone number associated with a service provider other than the mobile services provider a request for unlocking information. The request is transmitted via the services of the mobile services provider and is transparent to the mobile services provider. If the request is approved, the mobile terminal receives the unlocking information. Using the received unlocking information, the mobile terminal unlocks itself so that it is no longer locked to the services of the mobile services provider. If the request is not approved, the mobile terminal receives and displays a message indicating that the request is not approved.

An embodiment of the present invention is directed to a mobile terminal, which is initially locked to the services of a mobile services provider. The mobile terminal includes a transmitter that is configured to transmit to a predefined telephone number associated with a service provider other than the mobile services provider a request for unlocking information. The request is transmitted via the services of the mobile services provider and is transparent to the mobile services provider. The mobile terminal also includes a receiver that is configured to receive the unlocking information if the request is approved. Further, the mobile terminal includes a control unit that is configured to control the mobile terminal to unlock itself so that it is no longer locked to the services of the mobile services provider if the request is approved. The receiver may be further configured to receive a message indicating that request is not approved if the request is not approved. The mobile terminal may also include a display that is configured to display the message indicating that the request is not approved responsive to the receiver receiving the message indicating that the request is not approved.

BRIEF DESCRIPTION OF THE DRAWING

Other features and advantages of the invention will become clearly apparent in the course of the following description, which is given with reference to the appended drawing, which is a flowchart of the method of the invention.

DETAILED DESCRIPTION

The embodiments of the present invention described herein apply to any telecommunications or terminal compatible with network technologies such as DECT, CDMA, WCDMA, GSM, UMTS, etc.

As used herein, the term mobile communication terminal means any device associated with an integrated circuit card, also known as a microchip card, and conventionally referred to as a subscriber identity module ((SIM) or (USIM)) card.

In accordance with the invention, unlocking is performed by the telephone itself at the request of the user. To this end, the manufacturer sends specific information constituting an unlocking key to the telephone concerned.

Thus, according to the invention, a telephone manufacturer holds in a database the unlocking keys of all the telephones that it has manufactured, without communicating them to operators to whom it has shipped telephones.

However, the keys are associated in the database with means for identifying the corresponding telephones. For example, the serial number of the telephone may be used as unique characterizing information (International Mobile Equipment Identity—IMEI).

An operator may store in its own database the identification of a telephone supplied to a particular user, again with reference to its serial number, for example.

In a symmetrical manner, a user may easily identify his telephone, for example simply by reading the serial number indicated on the telephone. According to the invention, a user who requires unlocking of his telephone communicates an unlocking request directly to the manufacturer of the telephone (step 101) together with the identification of the telephone concerned, for example its serial number (step 102).

This communication is transparent for the user's operator. The communication is affected by a telephone call using the telephone itself, for example by the user calling a telephone number indicated alongside the serial number or supplied by the operator at the time of submitting the request.

The manufacturer and the operator verify that the user is entitled to request unlocking (step 103), either manually by means of a telephone call or automatically by automated database look-up means. In this step, the operator does not have to consult lists of keys from various sources, but merely verifies its contractual relationship with a user in regard to a listed telephone. Verification is therefore much simpler and leads to a "yes" or a "no" response.

If the response is "no," unlocking is refused and the action terminates in a refusal (step 104).

If the response is "yes," the manufacturer communicates the unlocking instruction directly to the user (step 105).

This communication is also affected by any suitable means, i.e. usually by sending via the telephone network an unlocking code received by the telephone itself, which then proceeds to unlock itself.

Clearly this code is transmitted via the network managed by the operator, but once again the latter merely serves as a passive transmitter, for whom the operation is transparent.

In a variant of the invention, the manufacturer sends the code using a secure system provided in advance for preventing fraudulent unlocking by an unauthorized third party.

The telephone is then unlocked (step 106).

To minimize errors and complaints, the invention also proposes to send the user, and possibly the operator, a confirmation message containing a summary of the operations effected.

The message includes at least an indication of unlocking of the telephone, or, where applicable, of refusal to unlock. It may also contain complementary information such as references, for example time references, of the unlocking request and the outcome thereof, and, where applicable, the reasons for refusal. Where appropriate, in order to preserve the confidentiality of some of the information transmitted, the message sent to the operator is different from that sent to the user.

The message may be sent by any means.

The data may advantageously be transmitted digitally on the speech channel using a data modulation device. The bit rate of the data and the carrier frequency of the modulation may be chosen so that the shape of the main lobe of the data modulation spectrum at the input of the speech coder is preserved on the output side of the speech coder and decoder.

Thus, the bit rate is relatively low, and there is no additional cost for data transmission as no specific subscription is required to transmit the data. Another advantage of this solution is that it enables a manufacturer to obtain access to all its terminals, even if the user has not subscribed to data transmission services ("service data") or if the user's terminal is not compatible. This solution does not rule out other solutions. A transmission medium such as the GPRS, for example, may be used.

What is claimed is:

1. A method of unlocking a mobile terminal that is locked to services of a mobile services provider, a manufacturer of the mobile terminal having information stored to unlock the mobile terminal from the services of the mobile services provider, the method comprising:
   transmitting, by the mobile terminal, a unique identifier of the mobile terminal; and
   on condition that the mobile terminal is entitled to be unlocked based on the unique identifier of the mobile terminal, receiving unlocking information generated by the manufacturer of the mobile terminal via a system of the manufacturer according to the information stored by manufacturer in association with the unique identifier of the mobile terminal,
   wherein the receiving of the unlocking information is conditioned on approval by the mobile services provider.

2. The method of claim 1, wherein the transmitting of the unique identifier includes sending a request to unlock the mobile terminal from the services of the mobile services provider via a network of the mobile services provider.

3. The method of claim 1, wherein the transmitting of the unique identifier includes sending a request, which is transparent to the mobile services provider.

4. The method of claim 1, wherein the approval is based on at least a relationship between a user of the mobile terminal and the mobile services provider.

5. The method of claim 1, wherein the transmitting of the unique identifier includes transmitting any of: (1) a telephone number; (2) a serial number; or (3) an International Mobile Equipment Identifier (IMEI), as at least a portion of the unique identifier.

6. The method of claim 1, further comprising:
   initially locking a Subscriber Identity Module (SIM) card to the mobile terminal such that the mobile terminal is locked to the services of the mobile services provider; and
   unlocking, using the received unlocking information, the SIM card from the mobile terminal such that another SIM card can operate with the mobile terminal.

7. A mobile terminal which is locked to services of a mobile services provider, the mobile terminal being configured to unlock itself from the services of the mobile services provider, a manufacturer of the mobile terminal having information stored to enable an unlocking operation, comprising:
   a transmitter configured to transmit a unique identifier of the mobile terminal; and
   a receiver configured to receive unlocking information generated by the manufacturer of the mobile terminal via a system of the manufacturer according to the information stored by the manufacturer in association with the unique identifier of the mobile terminal; and
   a processor configured to perform the unlocking operation to unlock the mobile terminal from the services of the mobile services provider using the received unlocking information, wherein the receiver receives the unlocking information conditioned on approval by the mobile services provider.

8. The mobile terminal of claim 7, wherein the transmitter is configured to send the unique identifier via a network of the mobile services provider.

9. The mobile terminal of claim 7, wherein the transmitter is configured to send a request including the unique identifier, which is transparent to the mobile services provider.

10. The mobile terminal of claim 7, wherein the approval is based on at least a relationship between a user of the mobile terminal and the mobile services provider.

11. The mobile terminal of claim 7, wherein the transmitter is configured to transmit a request, which includes any of: (1) a telephone number; (2) a serial number; or (3) an International Mobile Equipment Identifier (IMEI), as at least a portion of the unique identifier.

12. The mobile terminal of claim 7, further comprising:
a Subscriber Identity Module (SIM) card configured to be selectively locked to or unlocked from the mobile terminal causing the mobile terminal to be locked to or unlocked from the services of the mobile services provider.

* * * * *